July 25, 1944.　　O. E. SCHIRRA　　2,354,443
WINDOW SHIELD
Filed May 15, 1942
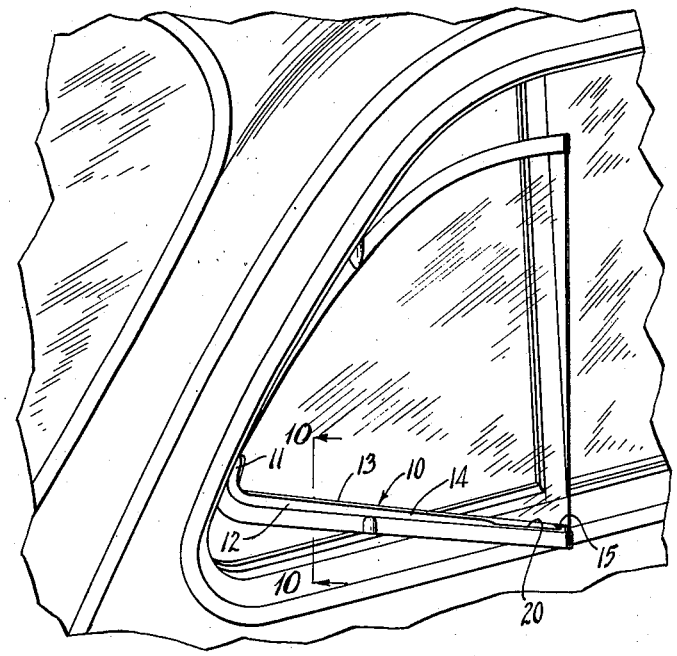
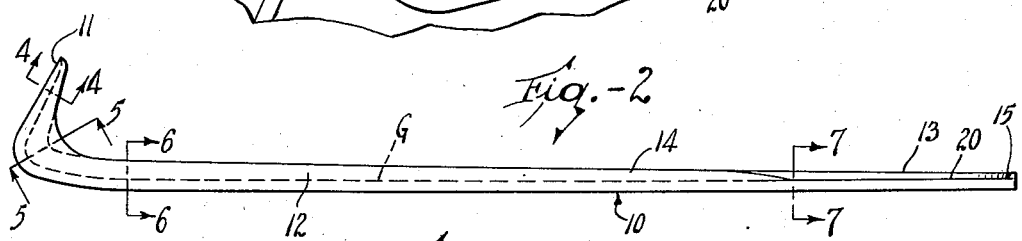
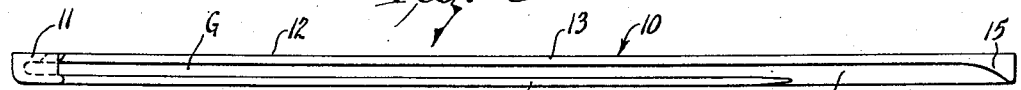
   
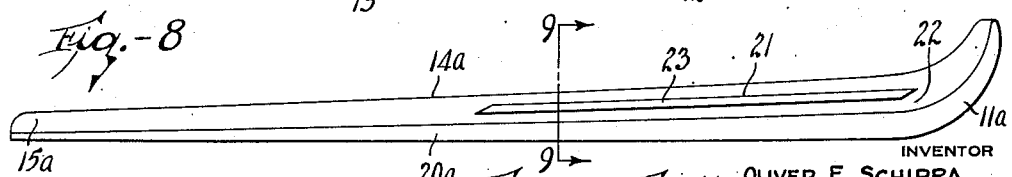
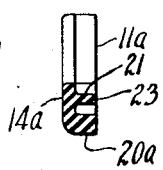 
INVENTOR
OLIVER E. SCHIRRA
BY Ely & Frye
ATTORNEYS Patented July 25, 1944

2,354,443

UNITED STATES PATENT OFFICE 2,354,443

WINDOW SHIELD

Oliver E. Schirra, Garfield Heights, Ohio

Application May 15, 1942, Serial No. 443,148

2 Claims. (Cl. 296—44)

This invention relates to window shields, and more especially it relates to such a shield adapted to be attached to the outside surface of the glass of an automobile "no-draft" type of ventilator window whereby water on the surface of the glass is prevented from running into the automobile body when the ventilator window is open and in "no-draft" operative position.

Upon the advent of high-speed automobiles a streamlined body shape that included a generally triangular shaped "no-draft" ventilator window came into vogue. In such windows the glass pane is ordinarily set in metal channels and the channels have pivoted mountings in the window frame whereby it may be turned transversely of its frame in such manner that its front edges extend into the automobile body and its rear edge extends outwardly from the said body. When the window is in this transverse position and the automobile is driven forward at a time there is no side wind blowing there will be a flow of air out of the automobile body through the ventilator window. The outwardly extended and backwardly slanting portion of the window will be forced against the air by the velocity of the automobile in its forward direction. The air will be set in motion and will be deflected outwardly as will be readily understood. This makes it possible for the occupants of the front seat of a sedan type of automobile or the occupants of a coupe type to open a front ventilator window while the automobile may be traveling at a high rate of speed without a strong rush of air inwardly through the open window, thus affording themselves fresh air without the inconvenience of a strong draft or wind striking them. However, these ventilating windows are not completely satisfactory in their present form. For example, on a hot summer day during a rain storm when an automobile is most uncomfortable when the windows are closed, these ventilator windows, if opened as described above, permit the rain that falls on the inwardly and forwardly turned portion of the pane to move forwardly on the glass until the water drops from the bottom of the pane or its channel member into the automobile where it wets the upholstery or it may fall upon the legs of the driver making him uncomfortable and distracting his attention from driving, which, of course, may cause him to lose control of the automobile.

This invention has as one of its objects to provide means for intercepting water that may reach the inside of an automobile body on a ventilator window pane and for discharging such water outside the automobile.

Another object of the invention is to provide such water-receiving means of a type that can be conveniently attached to the ventilator windows of automobiles now in use as well as to the windows of automobiles in the process of being manufactured.

Other objects and advantages of the invention will be manifest to those familiar with the art by reference to the accompanying drawing, wherein:

Fig. 1 is a perspective view of the device embodying the invention and in operative position on a ventilator window;

Fig. 2 is a side elevation of the device with its attaching edge turned inwardly;

Fig. 3 is a top plan view of the same;

Fig. 4 is a section taken on line 4—4 of Fig. 1;

Fig. 5 is a section taken on line 5—5 of Fig. 1;

Fig. 6 is a section taken on line 6—6 of Fig. 1;

Fig. 7 is a section taken on line 7—7 of Fig. 1;

Fig. 8 is a side elevation of another form of the invention looking at the attaching face;

Fig. 9 is a section on line 9—9 of Fig. 8;

Fig. 10 is a sectional view on line 10—10 of Fig. 1;

Fig. 11 is a sectional view of another form of the invention wherein the channel member is formed to provide a groove.

The shield embodying the invention is here illustrated as molded and composed of rubber. However, it is to be understood that any other satisfactory moldable material may be used or it may be fashioned from metal or wood or the like.

By reference to the drawing it will be seen that in one form the invention consists of a shield 10 having an upwardly turned end or head portion 11 and an elongated tapered body portion 12. The shield is attached to the pane of the ventilator window in operative position as shown in Fig. 1. While the shield may be placed in a slanting position in order to give more fall to water it may be draining, I have found that this is not necessary due to the bottom of a groove G being higher in its turned up portion and being open at its tapered end. Thus by reference to Figs. 4, 5, 6, and 7 it will be seen that the groove G has a rear side 13, a front side 14, and a bottom side 20, and that the said groove progressively changes its size and contour until it opens at approximately section 7—7 of Fig. 2 where the front side 14 terminates in a substantially abrupt tapered end, the rear side 13 continuing a distance beyond the end of side 14 and terminating in a slightly raised transverse end portion 15. This end portion acts as a baffle to the flow of water emerging from the groove G and assists in discharging the water from the shield. The inner side of the end portion 15 is formed with a radius in order that it will be more effective in turning water. The attachment of the shield to the pane of glass may be done by adhesion or by any other method found satisfactory. In the event the shield is composed of soft rubber, I have found that a cement such as that being commercialized by Henry G. Lange Machine Works of Chicago under the trade name "Superior" provides a satisfactory bond between the rubber of the shield and the glass of the window. It is to be noted that the rear side 13 has sufficient width and length to present a relatively large contact area to a window pane. Of course the rear side of the shield may be dispensed with as the glass against which the shield is placed will take the place of the side 13 in forming the groove G except for the transverse portion 15, which portion may be formed on the end of the bottom 20 as will be understood by those familiar with the art. To facilitate the attachment of the shield to the window pane the shield may have a "backing" of adhesive material applied to the attaching face of the side 13. In the case of a soft rubber shield, the attaching face may be buffed, cemented, and a backing of unvulcanized rubber on holland cloth may be applied so that when the shield is to be applied the holland cloth may be removed exposing a fresh tacky surface for contact with the pane or to receive additional adhesive applications. If the design of the ventilator window is such that its channel member in which the pane is held has sufficient area on its side to receive the shield, the shield may be attached to the channel as obviously it would function in that position. The embodiment of the invention as shown in Fig. 1 is for the left window of an automobile and could not be used on a right window. However, a universal shield may be designed by forming the side 13 to be the same as the side 14 and such modification is to be considered to come within the scope of this invention.

A modified form of the invention is shown in Fig. 8 wherein the rear side 13 of the form of the invention shown in Fig. 1 is omitted and a partition strip 21 is employed. This partition strip extends from a front side 14a to overhang a bottom portion 20a and is substantially parallel to it. The partition 21 terminates at its forward end so as to provide an opening 22 between its end and the raised head portion 11a. This opening 22 permits water to pass under said partition 21 along bottom portion 20a to a discharging point near an end portion 15a. It will now be seen that when a shield of this form is attached to a pane that the edge 23 of the portion 21 will contact the glass just as the edge of the bottom portion 20a does (see Fig. 9) and that a passageway having water receiving and discharging ends is provided. Under some conditions of service this passageway adds to the efficiency of the shield. A scientific explanation of the factors entering into the operation of this form of the invention, or the form first shown, or the other forms which may come within the spirit of the invention will not be attempted because of the many variables and the uncertain behavior of water on glass subjected to a moving gas. Whatever a true explanation of the behavior of the water on the ventilator window of the type here involved is, it is a fact that rain falling against the glass of such window often flows forward when the ventilator is in "no-draft" operative position and then downwardly where it drops off of the lower forward edge of the glass or its channel member. This flow of water is probably due to a partial vacuum being created behind the glass of the window—causing air from outside the automobile to flow along the forward surface of the glass into the automobile body. When the shield involving this invention is in position it intercepts the water in its grooves along which the water flows until it is caught by the strong backward pressure of the wind pressing against the outwardly and backwardly slanting portion of the ventilator window as the automobile travels forwardly in service.

Another form of the invention is illustrated in Fig. 11 wherein a channel member 30 in which the pane 31 of a no-draft automobile ventilator window is held has an extended portion 32 so shaped as to form a groove 33. The groove 33 involves that portion of the channel which lies adjacent to the shield 10 in Fig. 1, it being understood, of course, that if the groove 33 is formed in the said channel that such groove will function in the same manner as the groove G of the shield 10 and that the special channel replaces such shield.

Although more than one form of the invention has been illustrated and described in detail, it will be apparent to those skilled in the art that various modifications may be made without departing from the spirit of the invention and it is to be limited therefore only by the prior art and the scope of the appended claims.

I claim:

1. A window shield for a motor vehicle comprising a flexible molded rubber strip having an upwardly turned head portion and an elongated body portion, said strip having an upwardly facing longitudinal groove extending substantially the length of said strip, said groove being defined between a front and a rear side, said front side of said groove being shorter than the rear side whereby an outlet to said groove is provided, said rear side having an attaching face adapted to receive an adhesive material on said attaching face and to adhere to the outer surface of a window pane, whereby, in combination with the flexible characteristics of said strip, said shield may be bent to any desired shape and may be attached to said pane surface at any selected location thereby providing means applicable to various shaped windows whereby rain falling on said window is intercepted and discharged outside said vehicle.

2. A shield for the hinged ventilating windows of a motor vehicle comprising a flexible molded rubber strip having an upwardly turned head portion, and an elongated body portion terminating in a trailing end portion, said strip having an upwardly facing longitudinal groove extending substantially the length of said strip, said groove being defined between a front and a rear side, an outlet to said groove being provided at the trailing end portion, said rear side having an attaching face adapted to receive an adhesive material on said attaching face and to adhere to the outer surface of the window, whereby the flexible shield may be attached to said window surface with the head portion at the forward portion of the window and the trailing end portion at the rearward portion of the window so that rain falling on said window is intercepted and discharged outside said vehicle when said window is outwardly hinged.

OLIVER E. SCHIRRA.